United States Patent [19]
Okano et al.

[11] Patent Number: 5,649,861
[45] Date of Patent: Jul. 22, 1997

[54] GAME DEVICE FOR DISPLAYING GAME INPUT OPERATIONS ON THE DISPLAY

[75] Inventors: Tetsu Okano; Tadashi Kagawa, both of Tokyo, Japan

[73] Assignee: Sega Enterprises, Ltd., Tokyo, Japan

[21] Appl. No.: 294,811

[22] Filed: Aug. 25, 1994

[30] Foreign Application Priority Data

Aug. 25, 1993 [JP] Japan ..... 5-210219
Aug. 15, 1994 [JP] Japan ..... 6-191376

[51] Int. Cl.$^6$ ..... A63F 9/24
[52] U.S. Cl. ..... 463/30; 463/36; 273/148 B
[58] Field of Search ..... 273/438, 148 B, 273/433, 434, 85 G, DIG. 28; 364/410; 345/158, 157; 463/30, 36

[56] References Cited

U.S. PATENT DOCUMENTS

| | | | |
|---|---|---|---|
| Re. 33,559 | 3/1991 | Fallacaro et al. | 273/DIG. 28 |
| 4,720,789 | 1/1988 | Hector et al. | 364/410 |
| 4,817,950 | 4/1989 | Goo | 273/438 |
| 4,925,189 | 5/1990 | Braeuniq | 273/148 B |
| 5,139,261 | 8/1992 | Openiano | 273/438 X |
| 5,162,781 | 11/1992 | Cambridge | 345/158 X |
| 5,229,756 | 7/1993 | Kosugi et al. | 273/438 X |
| 5,288,078 | 2/1994 | Capper et al. | 273/438 X |
| 5,363,120 | 11/1994 | Drumm | 345/158 |
| 5,394,168 | 2/1995 | Smith, III et al. | 345/158 X |
| 5,405,152 | 4/1995 | Katanics et al. | 273/438 |
| 5,414,256 | 5/1995 | Gurner et al. | 364/410 X |
| 5,444,462 | 8/1995 | Wambach | 345/158 |
| 5,483,261 | 1/1996 | Yasutake | 345/158 X |

FOREIGN PATENT DOCUMENTS 9209983  11/1992  WIPO ..... 345/158

Primary Examiner—Jessica Harrison
Assistant Examiner—Michael O'Neill
Attorney, Agent, or Firm—Dickstein Shapiro Morin & Oshinsky LLP

[57] ABSTRACT

A game device comprises operational input means 30, 40 for inputting operational signals supplied by operation of game players, game control means 10 for controlling a game, based on the operational signals of the operational input means 30, 40, and game display means 20 for displaying the game controlled by the game control means 10, the operational signals of the operational input means 40 being displayed by the game display means 20. The game player can confirm game operations they made. As a result, the game player can relatively readily see their game operations they made without stress given to them.

17 Claims, 7 Drawing Sheets

GAME DEVICE FOR DISPLAYING GAME INPUT OPERATIONS ON THE DISPLAY

BACKGROUND OF THE INVENTION

The present invention relates to a game device comprising operational input means for inputting operational signals produced by operation of a player of a game, game control means for controlling the game, based on the operational signals of the operational input means, and game display means for displaying the game controlled by the game control means.

Game centers are popular as amusement facilities easily enjoyed at hand, and improved game devices come out one after another. Contents of games played on the game devices become increasingly sophisticated and complicated. As game contents become more sophisticated and complicated, operations by players are increasingly complicated. A considerably large number of the improved game devices use, for fancy, new operational input means.

As such sophisticated and complicated game contents of game devices require various operations, it is not easy for players to learn their game operations.

In a case that the contents of a game is so complicated that one motion requires a string of game operations, even when a player who has learned its operation is sure that he has made correct operations, sometimes the operations are actually incorrect, and characters do not move as he expects. This puts stress on the player.

Such conventional game devices find it difficult to satisfy players by simple game contents, while as game contents become more sophisticated and complicated, it is difficult for players to correctly learn various game operations and make perfect operations. This gives stress to the players, and this is a problem.

SUMMARY OF THE INVENTION

A first object of the present invention is to provide a game device which makes game players free from stress and makes them readily familiar with complicated game operations.

A second object of the present invention is to provide a method of displaying a game which makes readily familiar with complicated game operations.

The above-described first object is achieved by a game device comprising operational input means for inputting operational signals produced by operation of a player of a game, game control means for controlling the game, based on the operational signals of the operational input means, and game display means for displaying the game controlled by the game control means, the game control means including operational display means for displaying in the game display means the operational signals inputted by the operational input means.

In the above-described game device, it is preferable that the operational display means comprises display element storing means for storing a plurality of display elements for displaying a plurality of operational signals supplied by the operational input means, and display element selecting means for selecting a display element to be displayed among said plurality of display elements stored in the display element storing means, based on an operational signal supplied by the operational input means.

In the above-described game device, it is preferable that the operational input means includes a first operational input means to be operated by a first player of the game, and a second operational input means to be operated by a second player of the game, and the display element stores means storing first display elements for displaying a plurality of operational signals supplied by the first operational input means, and second display elements for displaying a plurality of operational signals supplied by the second operational input means.

In the above-described game device, it is preferable that the operational input means includes a plurality of operational buttons to be operated by the player, and said plurality of display elements are arranged corresponding to a layout of the operational buttons of the operational input means.

In the above-described game device, it is preferable that the operational input means includes an operational mat for the player to stand on, and a plurality of sensors arranged around the operational mat for detecting the arms and legs of the player extended thereabove to input operational signals in accordance with motions of the arms and legs of the player, and said plurality of display elements are arranged corresponding to an arrangement of said plurality of sensors of the operational input means.

In the above-described game device, it is preferable that said plurality of display elements are displayed at a set position on a display screen for displaying the game.

In the above-described game device, it is preferable that the first display elements are displayed at a first set position on the side of a display screen for displaying the game where the first display operational input means is positioned, and the second display elements are displayed at a second set position on the side of the display screen where the second display operational input means is positioned.

In the above-described game device, it is preferable that the player operates his own character in the game to play the game, and said plurality of display elements follow the moving of the character on a display screen for displaying the game.

In the above-described game device, it is preferable that the first player operates a first character in the game to play the game, the second player operates a second character in the game to play the game, said first display elements follow the moving of the first character on a display screen for displaying the game, and said second display elements follow the moving of the second character on the display screen.

In the above-described game device, it is preferable that said plurality of display elements are displayed on a barrel part of the character.

In the above-described game device, it is preferable that said first display elements are displayed on a barrel part of the first character, and said second display elements are displayed on a barrel part of the second character.

The above-described second object is achieved by a method of displaying a game controlled based on operational signals produced by operation of a player of the game, the method further displaying the operational signals on a display screen for displaying the game.

In the above-described method, it is preferable that a plurality of display elements are stored for displaying a plurality of operational signals, and a display element to be displayed is selected among said plurality of display elements, based on an operational signal produced by operation of the player of the game.

In the above-described method, it is preferable that the game is controlled based on operational signals produced by operations of a first player and a second player of the game, said plurality of display elements comprise first display elements for displaying a plurality of operational signals produced by the first player, and second display elements for displaying a plurality of operational signals produced by the second player, and display elements to be displayed are selected among the first display elements and second display elements, based on operational signals produced by operations of the first player and the second player of the game.

In the above-described method, it is preferable that said plurality of display elements are arranged corresponding to a layout of a plurality of operational buttons which are operated by the player to input said plurality of operational signals.

In the above-described method, it is preferable that an operational mat is provided for the player to stand on, a plurality of sensors are arranged around the operational mat for detecting the arms and legs of the player extended thereabove to input operational signals in accordance with motions of the arms and legs of the player, and said plurality of display elements are arranged corresponding to an arrangement of said plurality of sensors.

In the above-described method, it is preferable that said plurality of display elements are displayed at a set position on a display screen for displaying the game.

In the above-described method, it is preferable that the player operates his own character in the game to play the game, and said plurality of display elements follow the moving of the character on a display screen for displaying the game.

In the above-described method, it is preferable that said plurality of display elements are displayed on a barrel part of the character.

According to the present invention, there is provided operational display means for displaying operational signals inputted by operation of operational input means by game player. The game player can confirm game operations they made. As a result, the game player can relatively readily see their game operations they made without stress given to them.

In the above-described game device, the operational display means includes display element storing means for storing a plurality of display elements indicative of a plurality of operational signals supplied by the operational input means, and display element selecting means for selecting a display element to be displayed among the plurality of display elements stored in the display element storing means, based on an operational signal supplied by the operational input means, whereby the operational signal inputted by the operation input means can be discriminatively confirmed.

In the above-described game device, there are provided as the operational input means, first operational input means which is operated by a first player of the game, and second operational input means which is operated by a second player of the game, and first display elements for displaying a plurality of operational signals supplied by the first operational input means, and second display elements for displaying a plurality of operational signals supplied by the second operational input means are stored by the element storing means, whereby the two operational input means can be discriminatively confirmed.

In the above-described game device, a plurality of display elements are arranged corresponding to an arrangement of operational buttons of the operational input means, whereby operational states of the operational input means can be readily seen.

In the above-described game device, in the case that the operational input means includes an operational mat for the player to stand on, and a plurality of sensors arranged around the operational mat for detecting the arms or legs of the player outwardly extended, the plural display elements are arranged corresponding to an arrangement of the plurality of sensors of the operational input means, whereby even if the operational input means is difficult to see operational states, operational signals can be seen without failure.

In the above-described game device, the plural display elements are set in position on the display screen for a game to be displayed, whereby operational states of the operational input means can be readily seen.

In the above-described game device, the first display elements are displayed at a first set position on the side of a display screen where the first operational input means is positioned, and the second display elements are displayed at a second set position on the side of the display screen where the second operational input means is positioned, whereby the two operational input means can be discriminatively confirmed.

In the above-described embodiment, in the case that the player operates his own character to play the game, a plurality of display elements follow the moving of the character on a display screen for displaying the game, whereby the game player only looks at motions of the character to readily see the operational signals he inputted. A plurality of display elements are displayed especially at a barrel part of the character, whereby the game player can very readily see his operational signals.

In the above-described game device, in the case that the first player operates a first character in the game to play the game, and that the second player operates a second character in the game to play the game, said first display elements follow the moving of the first character on a display screen for displaying the game, and said second display elements follow the moving of the second character on the display screen for displaying the game, whereby the first and second players only look at motions of the characters to readily see the operational signals. A plurality of display elements are displayed especially at a barrel part of the character, whereby the players can very readily see his operational signals.

According to the present invention, in a method of displaying a game controlled based on operational signals produced by operation of a player of the game, the operational signals are displayed on a display screen for displaying the game, whereby the player can readily see their game operations they made without stress given to them.

In the above-described method, a plurality of display elements are stored for displaying a plurality of operational signals, and a display element to be displayed is selected among said plurality of display elements, based on an operational signal produced by operation of the player of the game, whereby the operational signal inputted by the player can be discriminatively confirmed.

In the above-described method, in the case that the game is controlled based on operational signals produced by operations of a first player and a second player of the game, said plurality of display elements comprise first display elements for displaying a plurality of operational signals produced by the first player, and second display elements for displaying a plurality of operational signals produced by the second player, and display elements to be displayed are selected among the first display elements and second display elements, based on operational signals produced by operations of the first player and the second player of the game, whereby the operations of the first player and the second player can be discriminatively confirmed.

In the above-described method, the plurality of display elements are arranged corresponding to a layout of a plurality of operational buttons which are operated by the player to input said plurality of operational signals, whereby the operational states of the operational bottoms can be readily seen.

In the above-described method, in the case that an operational mat is provided for the player to stand on, and a plurality of sensors are arranged around the operational mat for detecting the arms and legs of the player extended thereabove to input operational signals in accordance with motions of the arms and legs of the player, the plurality of display elements are arranged corresponding to an arrangement of said plurality of sensors, whereby even if the operation is difficult to see operational states, operational signals can be seen without failure.

In the above-described method, the plurality of display elements are displayed at a set position on a display screen for displaying the game, whereby operational states of the player can be readily seen.

In the above-described method, in the case that the player operates his own character in the game to advance the game, the plurality of display elements follow the moving of the character on a display screen for displaying the game, whereby the player only looks at motions of the character to readily see the operational signals he inputted. A plurality of display elements are displayed especially at a barrel part of the character, whereby the players can very readily see his operational signals.

DETAILED DESCRIPTION OF THE INVENTION

The game device according to a first embodiment of the present invention will be explained with reference to FIGS. 1 to 3B.

Figure 1:
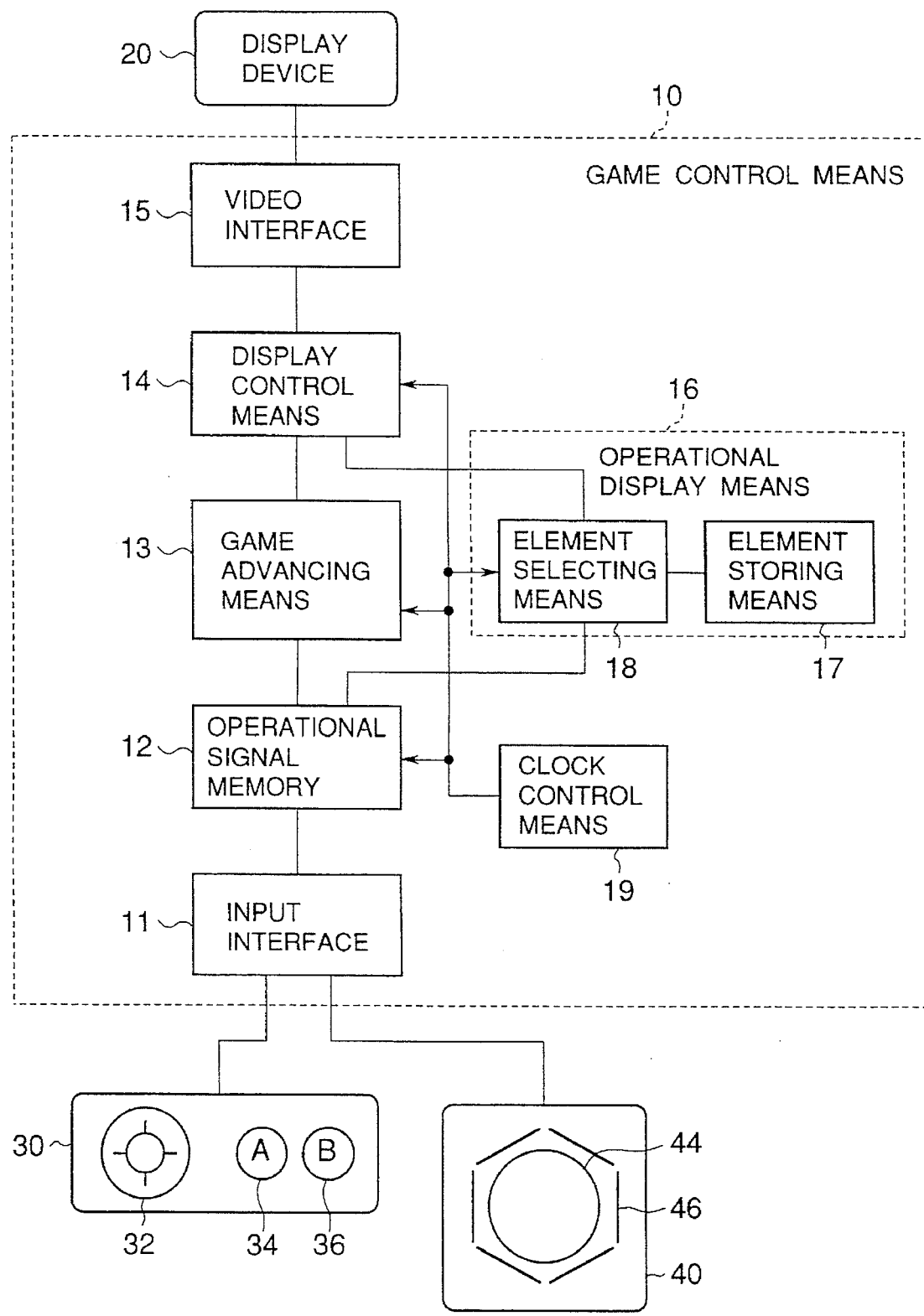
FIG. 1 is a block diagram of the game device according to a first embodiment of the present invention.

The game device according to the first embodiment, as shown in FIG. 1, comprises game control means 10 for controlling a game. The game control means 10 is connected to a display device 20 for displaying the game to be controlled. The game control means 10 is further connected to a usual controller 30 as operational input means for inputting operational signals indicative of operations made by a game player, and a light harp 40 as innovational operational input means.

The controller 30 includes a joy stick 32 for inputting an operational direction, and an A button 34 and a B button 36 for inputting selected operations.

Figure 2:
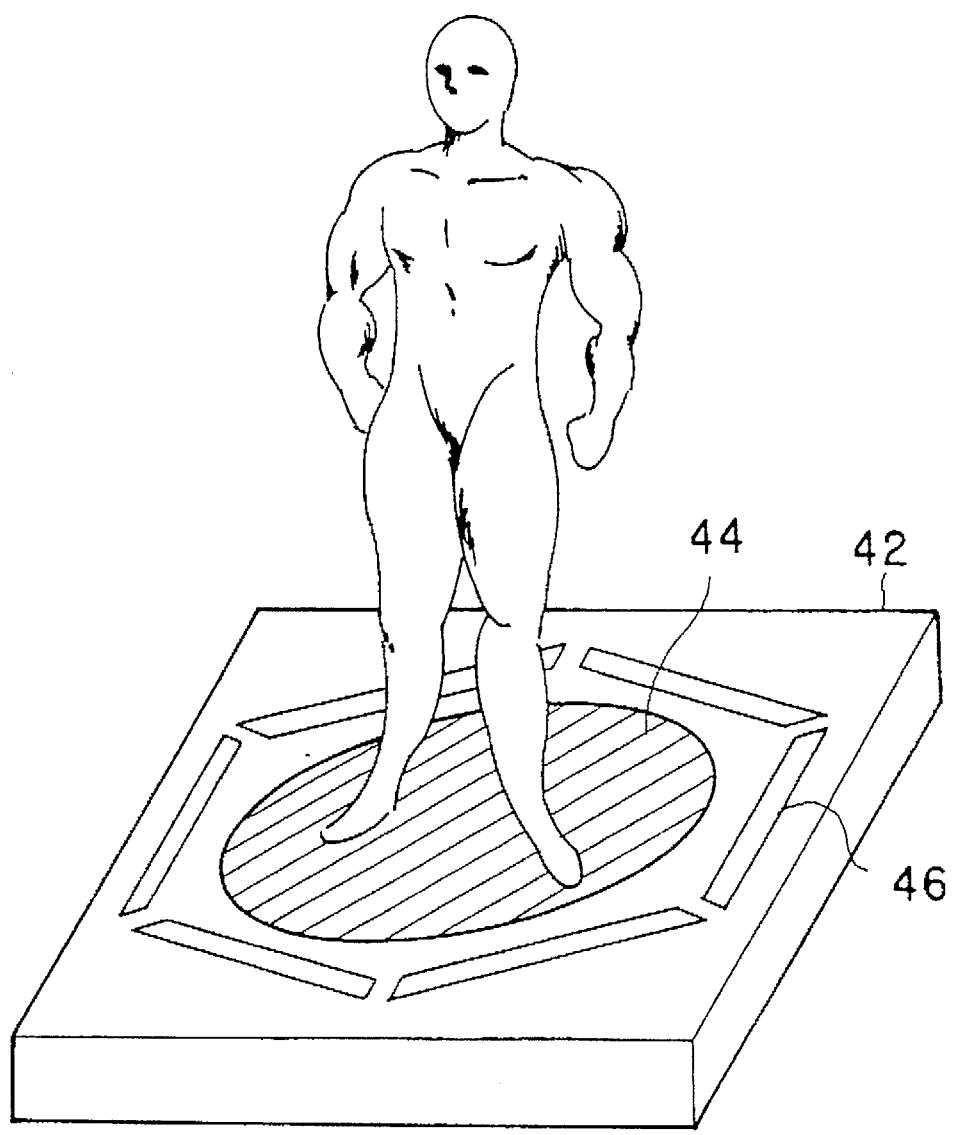
FIG. 2 is an explanatory view of the light harp used in the first embodiment of the present invention.

Differently from the conventional operational input means, such as a controller, etc., a game player bodily uses the light harp 40 to input signals thereto. As shown in FIG. 2, the light harp 40 comprises an operational mat 44 provided at the center thereof for detecting presence of a game player thereon, and 6 infrared ray sensors 46 provided around the operational mat 44. A game player stands on the operational mat 44 and extends his arms and legs above the infrared ray sensors 46. The infrared ray lamps 46 detect block of the infrared rays by their reflection against the arms and the legs. The operational mat 44 is off while a game player is thereon and is turned on when the game player jumps on the operational mat 44.

The game control means 10 is connected to operational input means, such as the controller 30 and the light harp 40, through an input interface 11. Operational signals from the operational input means are stored in an operational signal memory 12.

To advance a game based on a game program there is provided game advancing means 13. The game advancing means 13 advances the game in response to the operational signals stored in the operational signal memory 12 and outputs advancing states to the display control means 14.

The display control means 14 controls game displays to be displayed in accordance with advancing states of a game outputted by the game advancing means 13. Picture display signals indicative of game displays are outputted to the picture display device 20 through a video interface 15.

The game control means 10 includes operational display means 16 for displaying operational signals from the operational input means, such as the controller 30, light harp 40, etc. on the display means 20.

The operational display means 16 includes element storing means 17 for storing a plurality of display elements for displaying a plurality of operational signals of the operational input means, such as the controller 30, the light harp 40, etc., and element selecting means 18 for selecting a display element to be displayed among the plurality of display elements stored in the element storing means 17. A layout and a shape of a plurality of display elements are set in accordance with a kind of the operational input means. Examples of the display elements will be described later.

The game control means 10 includes clock control means 19 for synchronization with picture display. Synchronization signals from the clock control means 19 are inputted to the operational signal memory 12, the game advancing means 13, the display control means 14 and the element selecting means 18.

In displaying operational signals, the element selecting means 18 outputs to the display control means 14, in synchronization with a start of a vertical blanking period for picture display, those of a plurality of elements stored by the element storing means 17 which are to be displayed, based on the operational signals stored by the operational signal memory 12. The selected elements are displayed on a video frame following the end of the vertical blanking period. Thus display control is conducted on operational signals during a vertical blanking period for picture display.

Figure 3A:
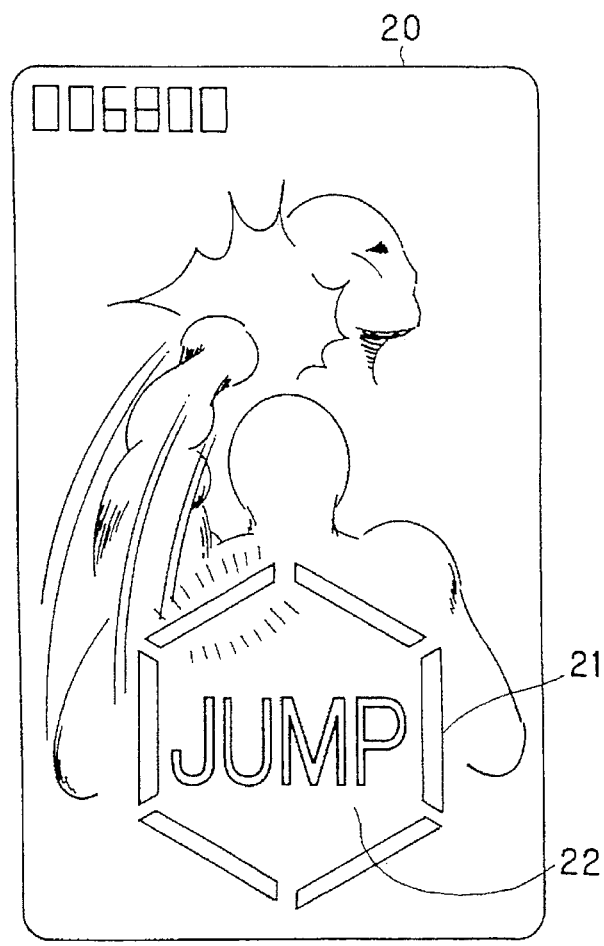
FIGS. 3A and 3B are views explaining motions of the game device according to the first embodiment of the present invention.

The light harp 40 as the operational input means of the present embodiment, which is quite innovational operational input means, is difficult to be understood as to what motion of a player supplies operational inputs. In the present embodiment, as shown in FIG. 3A, a plurality of display elements indicative of operational input states of the light harp 40 are set on the display screen of the picture display device 20.

That is, below the display screen of the display device 20 there are 6 arranged display segments 21 in a hexagon and display letters "JUMP" 22, which are arranged corresponding to a layout of the operational mat 44 and the 6 infrared ray sensors 46. When the infrared ray sensors 46 are turned on by operations of a game player, display segments 21 corresponding to the infrared ray sensors 46 change colors or flashes. When a game player jumps, and operational signals are supplied by the operational mat 44, the display letters 22 change colors, or flashes.

Next, the operation of the game device according to the present embodiment will be explained.

When a game is started in response to a start operational signal of the controller 30, operational signals of the controller 30 and the light harp 40 are stored by the operational signal memory 12 through the input interface 11.

The game advancing means 13 advances the game in accordance with the operational signals stored by the operational signal memory 12, based on a program of the game and outputs advancing states of the game to the display control means 14. The display control means 14 controls game pictures corresponding to advancing states of the game outputted by the game advancing means 13 to be displayed on the picture display device 20.

When a game player standing on the operational mat 44 of the light harp 40 extends outward his arms or legs, infrared ray sensors 46 corresponding to the extended arms or legs are turned on, and operational signals are inputted. These operational signals are stored by the operational signal memory 12.

The element selecting means 18 selects, based on the operational signals stored by the operational signal memory 12, a display segment 21 corresponding to the turned on infrared ray sensor 46 among the 6 display segments 21 and display letters 22 stored by the element storing means 17. The selected display segment 21 is displayed on the display device 20 by the display control means 14 such that the selected display segments 21 change colors or flash.

Figure 3B:
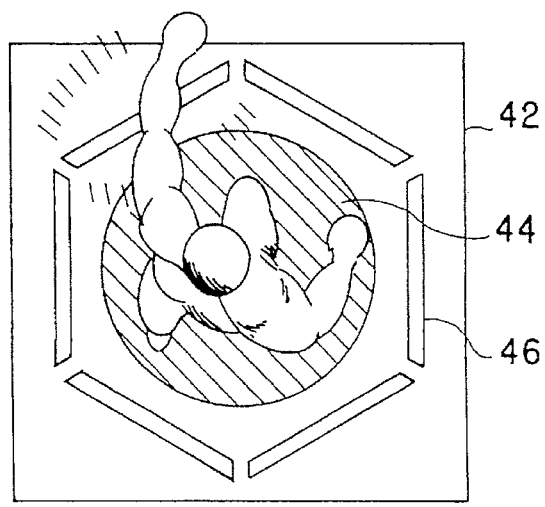

For example, as shown in FIG. 3B, when a game player extends the left arm to block the upper left infrared ray sensor 46 thereabove, a character on the display screen of the display device 20 is punching an opponent with the left arm, and the upper left display segment of the display segments 21 at the lower part of the display screen changes colors or flashes.

When the game player jumps on the operational mat 44, the operational mat 44 outputs operational signals. These operational signals are stored by the operational signal memory 12.

The element selecting means 16 selects display letters 22 stored by the element storing means 17, which correspond to the turned on operational mat 44. The selected display letters 22 are displayed on the display device 20 by the display control means 14 so that the selected display letters 22 change colors or flash.

Thus according to the present embodiment, a game player can enjoy a game while visually confirming his operational states on the display screen. Accordingly the player can accurately understand necessary operations of innovational operational input means, such as the light harp, without confusion. As a result, no stress is given to the game player.

The game device according to a second embodiment of the present invention will be explained with reference to FIGS. 4 to 7B. Common members of the second embodiment with the first embodiment are represented by common reference numerals not to repeat their explanation or to simplify their explanation.

Figure 4:
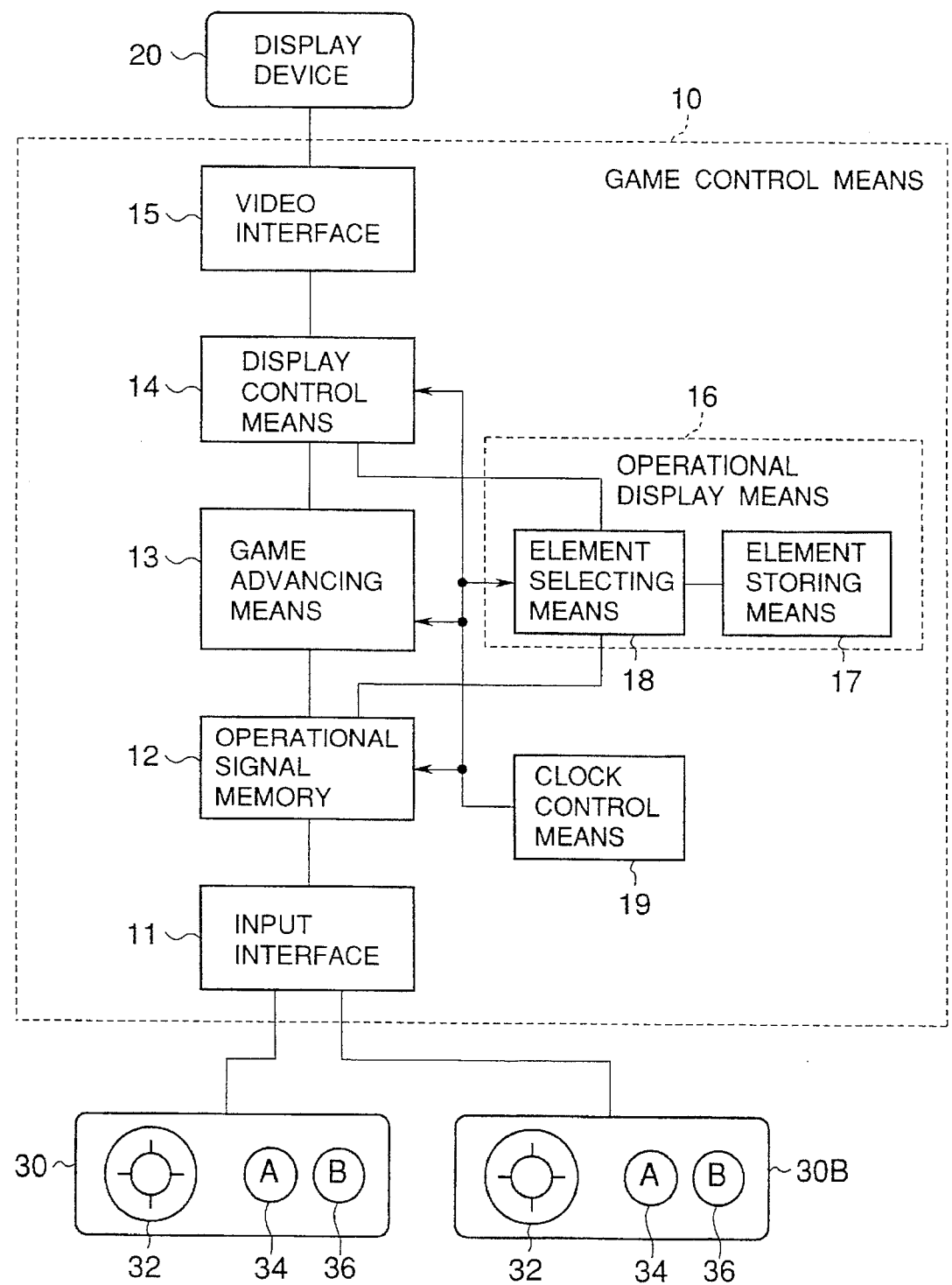
FIG. 4 is a block diagram of the game device according to a second embodiment of the present invention.

As shown in FIG. 4, the game device according to the second embodiment is connected to a display device 20 which displays a game controlled by game control means 10 for controlling a game, and to two controllers 30A, 30B as operational input means for inputting operational signals indicative of operations of a game player.

The controllers 30A, 30B each includes a joy stick 32 for inputting operational directions, and an A button 34 and a B button 36 for inputting selecting operations.

The second embodiment is characterized also in that operational signals inputted by operation of the controllers 30A, 30B by a game player are displayed by the picture display device 20. A layout and a shape of display elements stored by element storing means 17 are set in accordance with the controllers 30A, 30B as operational input means of the present embodiment.

Examples of display of the operational signals will be explained with reference to FIGS. 5 to 7B.

Figure 5:
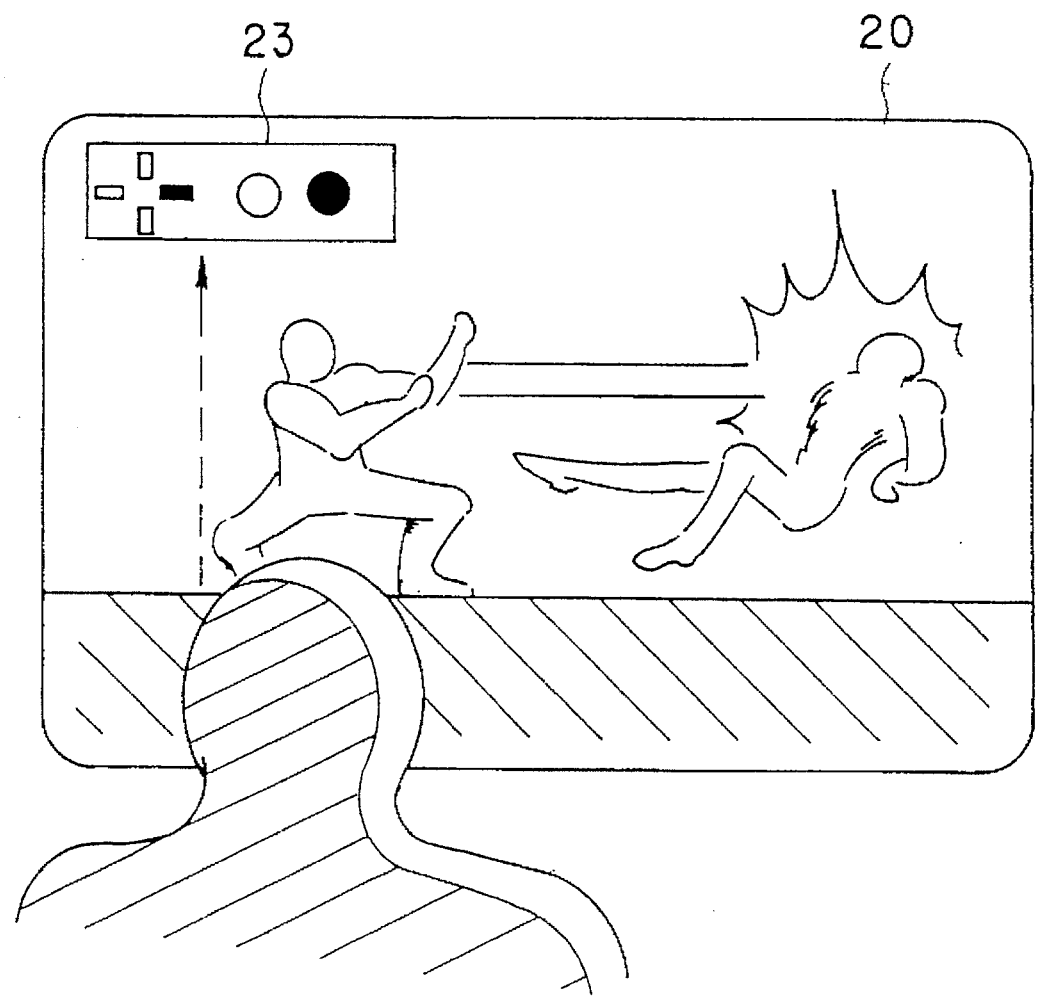
FIG. 5 is an explanatory view of a first display example of the game device according to the second embodiment of the present invention.

FIG. 5 shows a first display example that one game player plays a game using the controller 30A. A controller display region 23 is provided at a set position at an upper left part of the display screen of the display device 20. An operational direction by the joy stick 32 and selected operations by the button A 34 and the button B 36 are displayed in the controller display region 23. As shown in FIG. 5, a layout of the display elements correspond to an arrangement of the joy stick 32 and the operational buttons 34, 36 of the controller 30A.

A game player plays a game operating the controller 30A, and he looks at the controller display region 23 at the upper left part of the display screen as required to visually confirm operations he made. Thus game players can readily see relationships between operational states and motions of characters, which enables game players to enjoy games under no stress.

Figure 6:
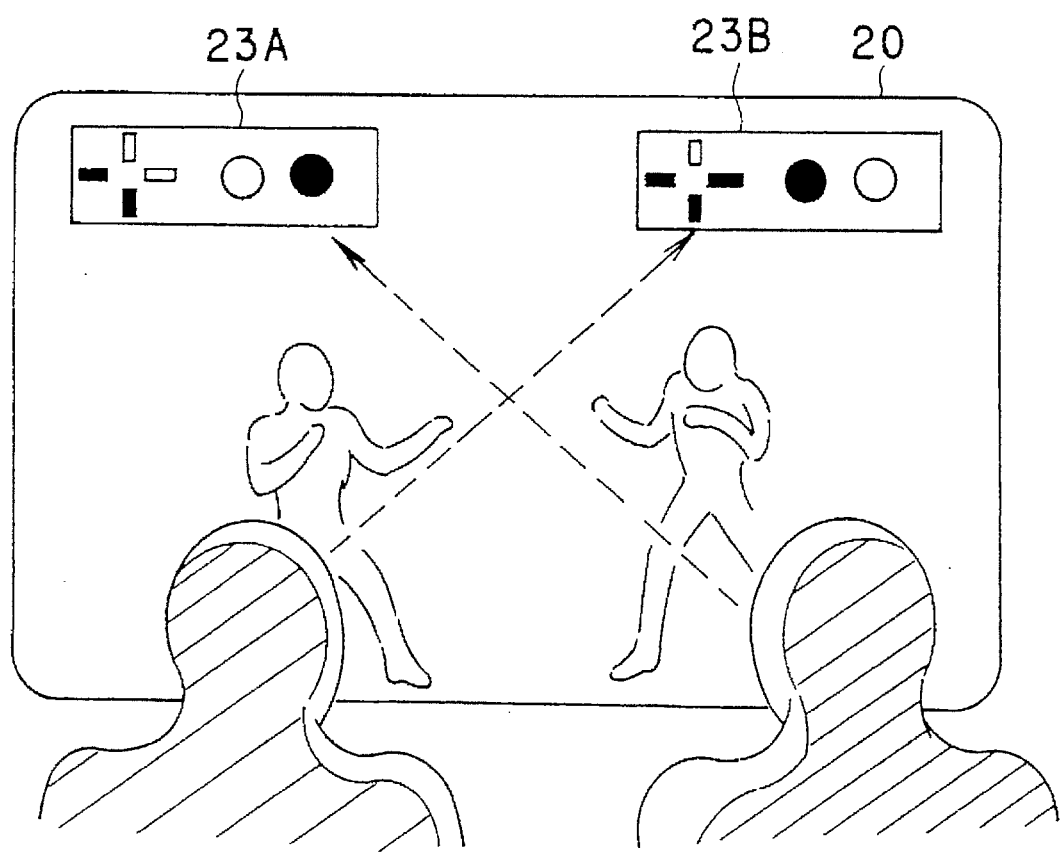
FIG. 6 is an explanatory view of a second display example of the game device according to the second embodiment of the present invention.

FIG. 6 shows a second display example that two game players play a game. Controller display regions 23A, 23B are provided at set positions at upper left and right parts of the display screen of the picture display device 20. Display positions of the controller display regions 23A, 23B correspond to positions of the controllers 30A, 30B. An operational direction of the joy stick 32 of the controller 30A, and selected operations by the button A 34 and the button B 36 of the controller 30A are displayed in the controller display region 23A, and in the controller display region 23B, an operational direction of the joy stick 32 of the controller 30B and selected operations by the button A 34 and the button B 36 of the controller 30B are shown.

One of the game players operates the controller 30A, and the other operates the controller 30B to play a game. The game players look at the controller display regions 23A, 23B of the display screen as required to visually confirm selected operational signals. Especially in a game played by two game players, the players can visually confirm not only their own operational states, but also operational states of the other, which permits the game players to take into account operational states of the other. As a result, sophisticated and very amusing games can be played.

Figure 7A:
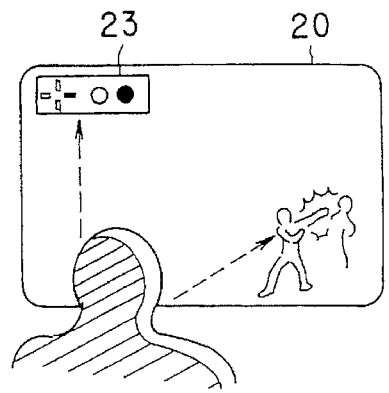
FIGS. 7A and 7B are explanatory views of a third display example of the game device according to the second embodiment of the present invention.
Figure 7B:
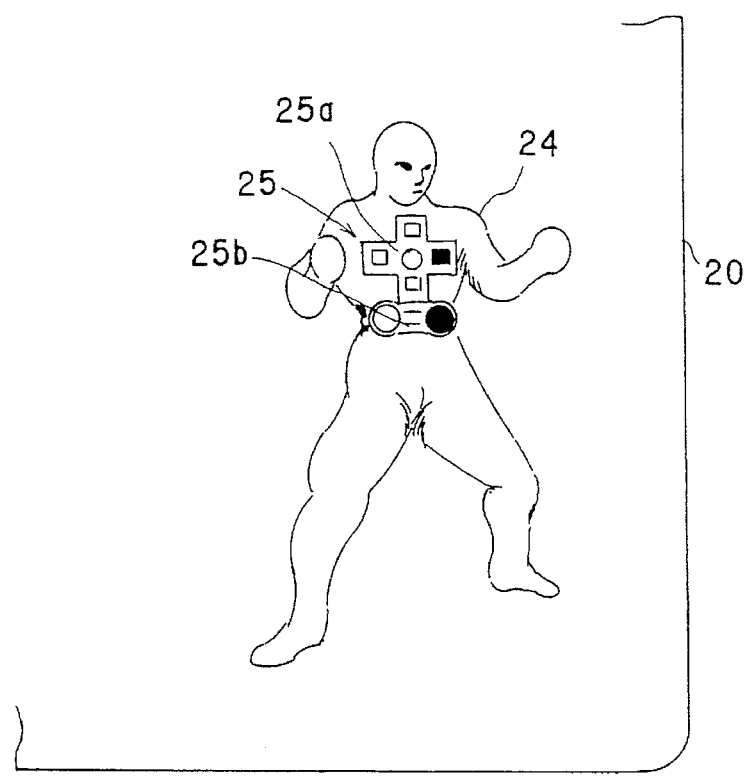

FIGS. 7A and 7B show a third example which is an improvement of the examples of FIGS. 5 and 6. In the examples of FIGS. 5 and 6, as shown in FIG. 7A, operational signals of the controllers 30A, 30B are displayed at set positions on the display screen of the picture display device 20. In this case, game players must pay attention to both motions of characters and displays on the controller display regions 23. As a result the game players can not concentrate and fail to make suitable operations.

As a countermeasure, for a game in which game players operate their own characters to play the game, the controller display regions are arranged to follow the moving characters.

As exemplified in FIG. 7B, the controller display region 25 is superposed on the character 24. A direction of the joy stick 32 is displayed on an upper part of a shirt worn by the character 24, and selected operations by the button A 34 and the button B 36 are displayed on lower parts of the shirt.

The controller display region 25 thus follows the character 24 on the move, whereby game players can pay attention concurrently to the character 24 and the controller display region 25, so that they can enjoy games, confirming without failure input states of operational signals.

The present invention is not limited to the above-described embodiments and covers other modifications and variations.

For example, the above-described embodiments use the controllers and the light harp as operational input means but may use other kind of operational input means. The present invention is effectively applicable especially to innovational operational input means.

The present invention may be applicable to game devices using three or more controllers, etc. as operational input means.

The present invention may be applied to communication game devices in which game deices are mutually connected by communication cables or others, and operational input signals of operational input means of the other game devices may be displayed on the display screen.

The above-described embodiments are applied to game devices used in game centers for explanation but may be applied to domestic game devices.

What is claimed is:

1. A game device comprising:

an operational input device for inputting operational signals produced in response to actions taken by a player of a game;

a display device;

a game controller, functionally connected to said operational input device and said display device, for controlling the progress of the game in response to the operational signals received from the operational input device, the game controller generating video signals for displaying the progress of the game on said display device, the game controller further generating signals for displaying an image simulating said operational input device on the display device so that the simulated image indicates the operational states of the operational input device in response to the actions taken by the player.

2. A game device according to claim 1, wherein said operational input device comprises a plurality of control elements operable by the player, said simulated image of the operational input device includes a plurality of display elements which simulates said plurality of control elements of the operational input device.

said game controller displays a turned-on state on said display device with respect to one of said plurality of simulated display elements which corresponds to one of the control elements of said plurality of control elements turned on by the player.

3. A game device according to claim 2, wherein the operational input device includes a first operational input device to be operated by the first player of the game, and a second operational input device to be operated by a second player of the game, each of the first and second operational input devices including a plurality of control elements operable by the player; and said game controller displays a pair of simulated images simulating said first and second operational input devices, the simulated image simulating said first operational input device including a plurality of first display elements which simulates the plurality of control elements of the first operational input device, and the simulated image simulating said second operational input device including a plurality of second display elements which simulates the plurality of control elements of the second operational input device.

4. A game device according to claim 2, wherein the operational input device includes a plurality of operational buttons to be operated by the player; and said game controller displays said plurality of display elements on said display device so as to simulate and be arranged, correspondingly to a layout of the operational buttons of the operational input device.

5. A game device according to claim 2, wherein the operational input device includes an operational mat for the player to stand on, and a plurality of sensors arranged around the operational mat for detecting the arms and legs of the player extended thereabove to input operational signals in accordance with motions of the arms and legs of the player; and said game controller displays said plurality of display elements on said display device so as to simulate, and be arranged, correspondingly to an arrangement of said plurality of sensors of the operational input device.

6. A game device according to claim 2, wherein said game controller displays said plurality of display elements at a predetermined position on a display screen of the display device.

7. A game device according to claim 5, wherein said game controller displays said plurality of display elements at a predetermined position on a display screen of the display device.

8. A game device according to claim 3, wherein said game controller:

displays said plurality of first display elements at a first predetermined position on the side of a display screen of the display device where the first operational input device is positioned; and displays said plurality, of second display elements at a second predetermined position on the side of a display screen of the display device where the second operational input device is positioned.

9. A game device according to claim 8, wherein said plurality of display elements are displayed on a barrel part of the character.

10. A game device according to claim 8, wherein said first display elements are displayed on a barrel part of the first character; and said second display elements are displayed on a barrel part of the second character.

11. A game device according to claim 2, wherein said game controller:

displays a character on the display device; and displays said simulated image with said plurality of display elements superposed on the character so that the simulated image moves on the display device together with the movement of the character in response to operation of said operational input device.

12. A game device according to claim 3, wherein said game controller:

displays a first and a second character on the display device;

displays a first simulated image with a plurality of display elements superposed on the first character so that the first simulated image moves on the display device together with the movement of the first character in response to operation of said first operational input device; and displays a second simulated image with a plurality of display elements superposed on the second character so that the second simulated image moves on the display device together with the movement of the second character in response to operation of said second operational input device.

13. A game apparatus comprising:

a switching controller to be operated by a player;

a display device; and a game controller functionally connected to said controller and said display device for controlling the progress of the game in response to signals received from the switching controller, for generating video signals for displaying the progress of the game on said display device, and for displaying an image simulating said switching controller on the display device so that the simulated image indicates the operational states of the switching controller in response to the operation actions of the player.

14. The game apparatus of claim 13, wherein said switching controller includes a joystick and switching buttons, said game controller displaying on the display device simulated image elements indicative of switches of the joystick and the buttons, and indicating an activated state with respect to one of the simulated image elements which corresponds to one of the switches selectively activated by the player.

15. The game apparatus of claim 14, wherein said game controller changes the color of the selected image element corresponding to the selectively activated switch.

16. The game apparatus of claim 14, wherein said game controller flashes the selected image element corresponding to the selectively activated switch.

17. The game apparatus of claim 13, wherein said switching controller includes an operational mat for the player to stand on and a plurality of light sensors arranged around the operational mat for detecting the arms and legs of the player extended thereabove to supply said game controller with operational signals in accordance with motions of the arms and legs of the player, said game controller displaying on the display device simulated image elements indicative of said operational mat and said plurality of light sensors and an activated state with respect to one of the simulated image elements which corresponds to one of the sensors selectively activated by the player.

* * * * *

(12) REEXAMINATION CERTIFICATE (4805th)
United States Patent
Okano et al.

(10) Number: US 5,649,861 C1
(45) Certificate Issued: Jul. 8, 2003

(54) GAME DEVICE FOR DISPLAYING GAME INPUT OPERATIONS ON THE DISPLAY

(75) Inventors: Tetsu Okano, Tokyo (JP); Tadashi Kagawa, Tokyo (JP)

(73) Assignee: Sega Enterprises, Ltd., Tokyo (JP)

Reexamination Request:
No. 90/006,103, Sep. 6, 2001

Reexamination Certificate for:
Patent No.: 5,649,861
Issued: Jul. 22, 1997
Appl. No.: 08/294,811
Filed: Aug. 25, 1994

(30) Foreign Application Priority Data

Aug. 25, 1993 (JP) ............................................. 5-210219
Aug. 15, 1994 (JP) ............................................. 6-191376

(51) Int. Cl.$^7$ .................................................. A63F 9/24
(52) U.S. Cl. ........................ 463/30; 463/36; 273/148 B
(58) Field of Search ........................ 463/1, 7–8, 30–31, 463/36–39, 43–44; 273/148 B; 345/156, 161

(56) References Cited

U.S. PATENT DOCUMENTS 4,662,635 A * 5/1987 Enokian
4,856,787 A * 8/1989 Itkis

FOREIGN PATENT DOCUMENTS

JP 5-44179 6/1993

OTHER PUBLICATIONS

Operation Manual of "JOYMECHA FIGHT" with English Translation, 1993 Nintendo.

Article in Family Computer with English Translation, "Puznik", undated.

TAITO CORP., Super Famicon "Go! Go! With UU Quiz", Operation Manual, 1992 and English language translation.

* cited by examiner

Primary Examiner—Mark Sager

(57) ABSTRACT

A game device comprises operational input means 30, 40 for inputting operational signals supplied by operation of game players, game control means 10 for controlling a game, based on the operational signals of the operational input means 30, 40, and game display means 20 for displaying the game controlled by the game control means 10, the operational signals of the operational input means 40 being displayed by the game display means 20. The game player can confirm game operations they made. As a result, the game player can relatively readily see their game operations they made without stress given to them.

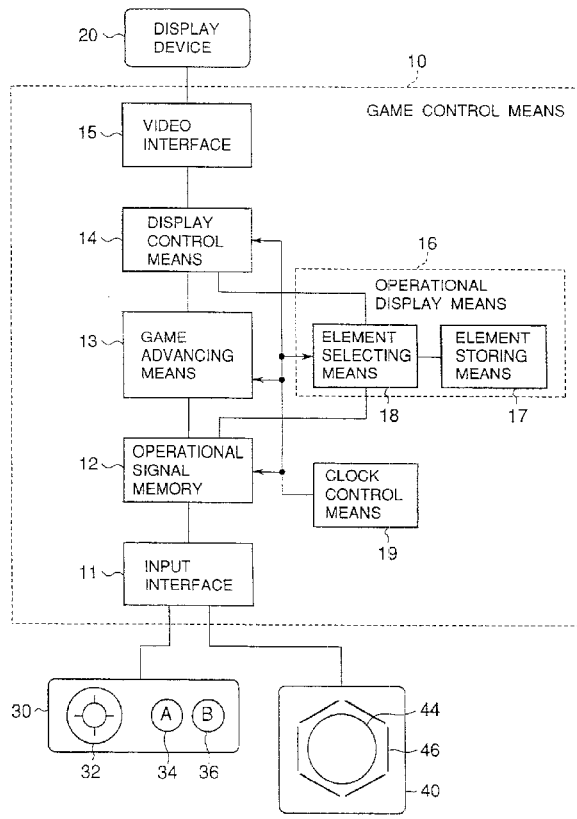

US 5,649,861 C1

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–3, 6, 8 and 13 are cancelled.

Claims 4, 5, 9–12, 14 and 17 are determined to be patentable as amended.

Claims 7, 15 and 16, dependent on an amended claim, are determined to be patentable.

4. A game device [according to claim 2, wherein] *comprising:*

*an operational input device for inputting operational signals produced in response to actions taken by a player of a game;*

*a display device;*

*a game controller, functionally connected to said operational input device and said display device, for controlling the progress of the game in response to the operational signals received from the operational input device, the game controller generating video signals for displaying the progress of the game on said display device, the game controller further generating signals for displaying an image simulating said operational input device on the display device so that the simulated image indicates the operational states of the operational input device in response to the actions taken by the player,*

*wherein the operational input device includes a first operational input device to be operated by a first player of the game, and a second operational input device to be operated by a second player of the game,*

*wherein said game controller displays a pair of simulated images simulating said first and second operational input devices,*

*wherein each of the first and second operational input devices comprises a plurality of control elements operable by the player,*

*the simulated image simulating said first operational input device including a plurality of first display elements which simulates the plurality of control elements of the first operational input device, and the simulated image simulating said second operational input device including a plurality of second display elements which simulates the plurality of control elements of the second operational input device,*

*said game controller displays a turned-on state on said display device with respect to one of said plurality of simulated display elements which corresponds to one of the control elements of said plurality of control elements turned on by the player,* wherein the operational input device includes a plurality of operational buttons to be operated by the player; and said game controller displays said plurality of display elements on said display device so as to simulate and be arranged, correspondingly to a layout of the operational buttons of the operational input device.

5. A game device [according to claim 2, wherein] *comprising:*

*an operational input device for inputting operational signals produced in response to actions taken by a player of a game;*

*a display device;*

*a game controller, functionally connected to said operational input device and said display device, for controlling the progress of the game in response to the operational signals received from the operational input device, the game controller generating video signals for displaying the progress of the game on said display device, the game controller further generating signals for displaying an image simulating said operational input device on the display device so that the simulated image indicates the operational states of the operational input device in response to the actions taken by the player,*

*wherein the operational input device includes a first operational input device to be operated by a first player of the game, and a second operational input device to be operated by a second player of the game,*

*wherein said game controller displays a pair of simulated images simulating said first and second operational input devices,*

*wherein each of the first and second operational input devices comprises a plurality of control elements operable by the player,*

*the simulated image simulating said first operational input device including a plurality of first display elements which simulates the plurality of control elements of the first operational input device, and the simulated image simulating said second operational input device including a plurality of second display elements which simulates the plurality of control elements of the second operational input device,*

*said game controller displays a turned-on state on said display device with respect to one of said plurality of simulated display elements which corresponds to one of the control elements of said plurality of control elements turned on by the player,* wherein the operational input device includes an operational mat for the player to stand on, and a plurality of sensors arranged around the operational mat for detecting the arms and legs of the player extended thereabove to input operational signals in accordance with motions of the arms and legs of the player; and said game controller displays said plurality of display elements on said display device so as to simulate, and be arranged, correspondingly to an arrangement of said plurality of sensors of the operational input device.

9. A game device [according to claim 8, wherein] *comprising:*

*an operational input device for inputting operational signals produced in response to actions taken by a player of a game;*

*a display device;*

*a game controller, functionally connected to said operational input device and said display device, for controlling the progress of the game in response to the operational signals received from the operational input* device, the game controller generating video signals for displaying the progress of the game on said display device, the game controller further generating signals for displaying an image simulating said operational input device on the display device so that the simulated image indicates the operational states of the operational input device in response to the actions taken by the player, wherein the operational input device includes a first operational input device to be operated by a first player of the game, and a second operational input device to be operated by a second player of the game, wherein said game controller displays a pair of simulated images simulating said first and second operational input devices, wherein each of the first and second operational input devices comprises a plurality of control elements operable by the player, the simulated image simulating said first operational input device including a plurality of first display elements which simulates the plurality of control elements of the first operational input device, and the simulated image simulating said second operational input device including a plurality of second display elements which simulates the plurality of control elements of the second operational input device, said game controller displays a turned-on state on said display device with respect to one of said plurality of simulated display elements which corresponds to one of the control elements of said plurality of control elements turned on by the player, wherein said game controller displays said plurality of first display elements at a first predetermined position on the side of a display screen of the display device where the first operational input device is positioned, and displays said plurality of second display elements at a second predetermined position on the side of a display screen of the display device where the second operational input device is positioned; and wherein said plurality of display elements are displayed on a barrel part of [the] *a* character.

10. A game device [according to claim 8, wherein] comprising:

an operational input device for inputting operational signals produced in response to actions taken by a player of a game;

a display device;

a game controller, functionally connected to said operational input device and said display device, for controlling the progress of the game in response to the operational signals received from the operational input device, the game controller generating video signals for displaying the progress of the game on said display device, the game controller further generating signals for displaying an image simulating said operational input device on the display device so that the simulated image indicates the operational states of the operational input device in response to the actions taken by the player, wherein the operational input device includes a first operational input device to be operated by a first player of the game, and a second operational input device to be operated by a second player of the game, wherein said game controller displays a pair of simulated images simulating said first and second operational input devices, wherein each of the first and second operational input devices comprises a plurality of control elements operable by the player, the simulated image simulating said first operational input device including a plurality of first display elements which simulates the plurality of control elements of the first operational input device, and the simulated image simulating said second operational input device including a plurality of second display elements which simulates the plurality of control elements of the second operational input device, said game controller displays a turned-on state on said display device with respect to one of said plurality of simulated display elements which corresponds to one of the control elements of said plurality of control elements turned on by the player, wherein said game controller displays said plurality of first display elements at a first predetermined position on the side of a display screen of the display device where the first operational input device is positioned, and displays said plurality of second display elements at a second predetermined position on the side of the display screen of the display device where the second operational input device is positioned, wherein said first display elements are displayed on a barrel part of [the] *a* first character; and said second display elements are displayed on a barrel part of [the] *a* second character.

11. A game device [according to claim 2, wherein said game controller] *comprising*:

an operational input device for inputting operational signals produced in response to actions taken by a player of a game;

a display device;

a game controller, functionally connected to said operational input device and said display device, for controlling the progress of the game in response to the operational signals received from the operational input device, the game controller generating video signals for displaying the progress of the game on said display device, the game controller further generating signals for displaying an image simulating said operational input device on the display device so that the simulated image indicates the operational states of the operational input device in response to the actions taken by the player, wherein the operational input device includes a first operational input device to be operated by a first player of the game, and a second operational input device to be operated by a second player of the game, wherein said game controller displays a pair of simulated images simulating said first and second operational input devices, wherein each of the first and second operational input devices comprises a plurality of control elements operable by the player, the simulated image simulating said first operational input device including a plurality of first display elements which simulates the plurality of control elements of the first operational input device, and the simulated image simulating said second operational input device including a plurality of second display elements which simulates the plurality of control elements of the second operational input device, said game controller displays a turned-on state on said display device with respect to one of said plurality of simulated display elements which corresponds to one of the control elements of said plurality of control elements turned on by the player, and wherein said game controller:

displays a character on the display device; and displays said simulated image with said plurality of display elements superposed on the character so that the simulated image moves on the display device together with the movement of the character in response to operation of said operational input device.

12. A game device [according to claim 3, wherein said game controller] *comprising:*

*an operational input device for inputting operational signals produced in response to actions taken by a player of a game;*

*a display device;*

*a game controller, functionally connected to said operational input device and said display device, for controlling the progress of the game in response to the operational signals received from the operational input device, the game controller generating video signals for displaying the progress of the game on said display device, the game controller further generating signals for displaying an image simulating said operational input device on the display device so that the simulated image indicates the operational states of the operational input device in response to the actions taken by the player,* wherein the operational input device includes a first operational input device to be operated by a first player of the game, and a second operational input device to be operated by a second player of the game, wherein said game controller displays a pair of simulated images simulating said first and second operational input devices, wherein each of the first and second operational input devices comprises a plurality of control elements operable by the player, the simulated image simulating said first operational input device including a plurality of first display elements which simulates the plurality of control elements of the first operational input device, and the simulated image simulating said second operational input device including a plurality of second display elements which simulates the plurality of control elements of the second operational input device, said game controller displays a turned-on state on said display device with respect to one of said plurality of simulated display elements which corresponds to one of the control elements of said plurality of control elements turned on by the player, and wherein said game controller:

displays a first and second character on the display device;

displays a first simulated image with a plurality of display elements superposed on the first character so that the first simulated image moves on the display device together with the movement of the first character in response to operation of said first operational input device; and displays a second simulated image with a plurality of display elements superposed on the second character so that the second simulated image moves on the display device together with the movement of the second character in response to operation of said second operational input device.

14. [The] *A* game apparatus [of claim 13,] *comprising:*

*a switching controller to be operated by a player to control a movement of a game element;*

*a display device; and*

*a game controller functionally connected to said controller and said display device for controlling the progress of a game in response to signals received from the switching controller, for generating video signals for displaying the progress of the game on said display device, and for displaying the movement of the game element and an image simulating said switching controller on the display device so that the simulated image indicates the operational states of the switching controller in response to the operation actions of the player to move the game element,* wherein said switching controller includes a joystick and switching buttons, said game controller displaying on the display device simulated image elements indicative of switches of the joystick and the buttons, and indicating an activated state with respect to one of the simulated image elements which corresponds to one of the switches selectively activated by the player.

17. [The] *A* game apparatus [of claim 13,] *comprising:*

*a switching controller to be operated by a player to control a movement of a game element;*

*a display device; and*

*a game controller functionally connected to said controller and said display device for controlling the progress of a game in response to signals received from the switching controller, for generating video signals for displaying the progress of the game on said display device, and for displaying the movement of the game element and an image simulating said switching controller on the display device so that the simulated image indicates the operational states of the switching controller in response to the operation actions of the player to move the game element,* wherein said switching controller includes an operational mat for the player to stand on and a plurality of light sensors arranged around the operational mat for detecting the arms and legs of the player extended thereabove to supply said game controller with operational signals in accordance with motions of the arms and legs of the player[.], said game controller displaying on the display device simulated image elements indicative of said operational mat and said plurality of light sensors and an activated state with respect to one of the simulated image elements which corresponds to one of the sensors selectively activated by the player.

* * * * *